United States Patent [19]
Channell

[11] 4,079,193
[45] Mar. 14, 1978

[54] CENTRAL OFFICE CABLE SPLICE ENCLOSURE

[76] Inventor: William H. Channell, 122 Oak Tree Dr., Glendora, Calif. 91740

[21] Appl. No.: 746,704

[22] Filed: Dec. 2, 1976

[51] Int. Cl.² .......................................... H02G 15/18
[52] U.S. Cl. .............................. 174/138 F; 174/77 R; 174/93; 277/DIG. 10
[58] Field of Search .................... 174/74 A, 77 R, 91, 174/93, 138 F; 277/DIG. 10

[56] References Cited
U.S. PATENT DOCUMENTS

| | | | |
|---|---|---|---|
| 3,254,153 | 5/1966 | Kohler | 174/93 |
| 3,260,794 | 7/1966 | Kohler | 174/93 X |
| 3,441,662 | 4/1969 | Augenstein et al. | 174/77 R X |
| 3,449,507 | 6/1969 | Channell | 174/93 |
| 3,458,649 | 7/1969 | Channell | 174/77 R X |
| 3,518,358 | 6/1970 | Brown | 174/93 X |
| 3,916,086 | 10/1975 | Gillemot et al. | 174/93 |
| 3,935,373 | 1/1976 | Smith et al. | 174/77 R |

FOREIGN PATENT DOCUMENTS
421,216  3/1975  U.S.S.R. ................................ 174/93

Primary Examiner—Laramie E. Askin
Attorney, Agent, or Firm—Christie, Parker & Hale

[57] ABSTRACT

A housing for splicing a trunk cable to a plurality of tip cables has a detachable end cap for receiving the tip cables. The detachable end cap is constructed from a pair of attached molded sections having flat spaced parallel surfaces between which is positioned a rubber sealing member. A plurality of holes extend through the two sections and the sealing member for receiving the tip cables. The first section includes a plurality of integrally molded conically shaped knock-out members positioned in the holes of the first section and projecting through aligned holes in the sealing member and the second section. The knock-out members form a plug that substantially fills the associated holes of the sealing member. The knock-out members are removed from selected holes at the time of installation for receiving the tip cables into the housing.

12 Claims, 3 Drawing Figures

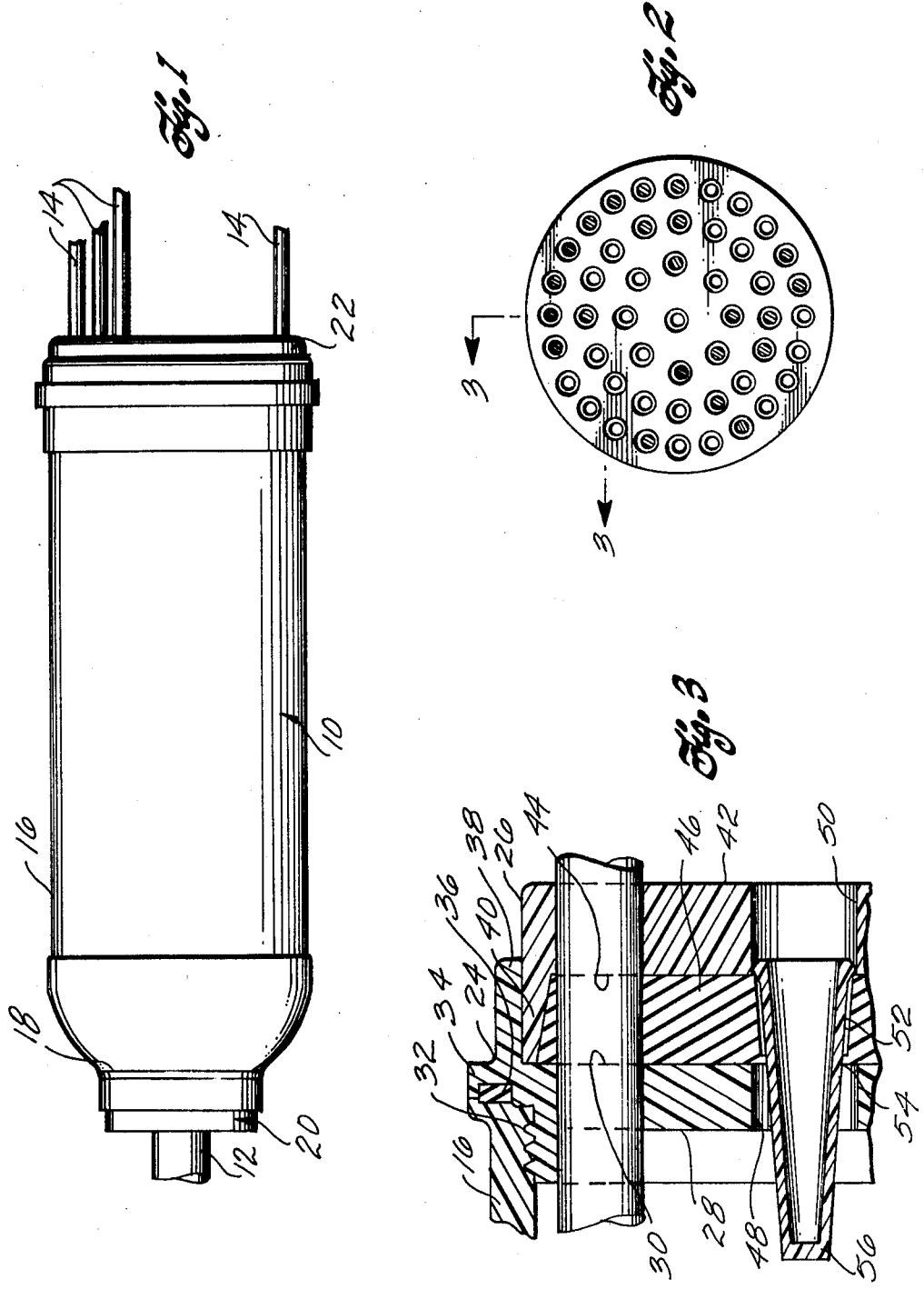

CENTRAL OFFICE CABLE SPLICE ENCLOSURE

FIELD OF THE INVENTION

This invention relates to cable splice housings, and more particularly, is concerned with a multiple cable sealing arrangement for cables entering the housing.

BACKGROUND

Telephone lines are frequently brought into central exchanges through large multiple-conductor trunk cables. One trunk cable may include as many as 4,000 conductor pairs. Such a trunk cable may be as much as 3 ½ inches in diameter. The switching equipment in the exchange is generally designed in units which handle up to 100 separate lines. It has therefore been the practice to connect a plurality of separate cables to a trunk cable, called tip cables, each of which contains 100 conductor pairs. Each tip cable then goes to a switching unit or other piece of equipment. There is, therefore, a need to provide some means of splicing up to 40 tip cables to a single incoming trunk cable. The splice, involving as it does up to 8,000 electrical connections, must be confined to a sealed environment to protect the splice connections from moisture and corrosive contaminants which could have an adverse effect on the terminal connections in the splice. It is therefore desirable to provide a sealed housing for the splice which may be pressurized if necessary to provide an inert environment for the exposed electrical terminal connections of the splice.

It has been the practice in the past to provide a housing in which the cables are brought in through rubber sealing members which are molded with an integral rubber sleeve extending around each opening receiving a cable. The sleeve may be clamped to the cable by a suitable clamping device which extends around the sleeve and squeezes it radially against the outer surface of the cable passing through the sleeve. Such an arrangement has not proved satisfactory for a number of reasons. Because of irregularities in the outer surface of the cable, an effective seal is not always obtained by such a sleeve and clamping arrangement. Where less than the maximum number of cables are brought into the housing, dummy plugs or the like must be made available at the time of installation to insert in the openings through the unused sleeves. Because the clamps are bulky, costly and difficult to install, attempts have been made to provide sleeves with sufficient internal resilience to be self-sealing, but this approach has proved unreliable.

SUMMARY OF THE INVENTION

The present invention is directed to an improved cable splice housing which can receive any number of tip cables up to the maximum number for which the housing is designed and which provides an effective seal where each tip cable enters the housing. No separate clamps are required to form a pressure tight seal between the housing and each of the cables entering the housing. Each tip cable enters through an opening which is initially closed off by an integrally molded knock-out element which can be easily removed at the time of installation to provide the necessary openings to accommodate the number of tip cables being spliced.

In brief, the present invention provides a housing for splicing a trunk cable to a plurality of tip cables having a detachable end cap through which all of the tip cables pass into the housing. The end cap includes a first molded section having a plurality of holes of slightly larger diameter than the tip cable, a second molded section having a plurality of holes axially aligned with the holes in the first member, and a sealing member of elastomeric material sandwiched between the first and second sections of the end cap and having tapered holes of smaller diameter than the tip cables aligned with the holes in the first and second sections through which the cables are inserted into the housing. One of said sections includes a plurality of tapered conically shaped knock-out elements. The larger diameter end of the conically shaped knock-out elements is integrally molded to the walls of the openings in one section with the other end of the knock-out elements projecting through the sealing member and out through the opening in the other section of the end cap. The plugs, by filling the unused openings in the sealing member, maintain the sealing member under lateral compression when cables are inserted through the unplugged openings in the end cap.

DESCRIPTION OF THE DRAWINGS

For a more complete understanding of the invention reference should be made to the accompanying drawings wherein:

FIG. 1 is an elevational view of the housing assembly of the present invention;

FIG. 2 is an end view of the cap of the housing;

FIG. 3 is a sectional view taken substantially on the line 3—3 of FIG. 2.

DETAILED DESCRIPTION:

Referring to the drawings in detail, the numeral 10 indicates generally the splice housing which receives a trunk cable 12 in one end, and a plurality of tip cables 14 entering the housing at the other end. The housing 10 includes a hollow cylindrical portion 16 and integral end wall 18 of molded phenolic or other suitable plastic material. The trunk cable 12 enters the housing through the end wall 18 and is sealed by a suitable grommet-type seal, indicated generally at 20, which is preferably of a design shown in my U.S. Pat. No. 3,848,074.

The other end of the housing 10 is formed by a removable end cap 22 which is threaded onto the cylindrical portion 16 of the housing. The end cap 22 receives the tip cables 14 which pass into the housing through sealed openings through the end cap in a manner hereinafter described in detail. With the cap 22 separated from the cylindrical portion 16, the conductors of the trunk cable can be joined to conductors of the tip cables to form an electrical splice in a conventional manner. Once the splice connections are completed, the housing is closed by sliding the cylindrical portion 16 of the housing over the splice connections and threading it onto the cap 22 after which the seal assembly 20 is tightened to provide a seal between the housing and the trunk cable 12.

Referring to FIGS. 2 and 3, construction of the end cap 22 is shown in detail. The end cap is constructed from two rigid molded plastic sections, an inner section 24 and an outer section 26. The inner section 24 includes a central disc portion having a pair of flat parallel circular surfaces 28 and 30. An outer integral rim portion includes an external thread 32 which is adapted to screw into a mating internal thread near the open end of the cylindrical portion 16 of the housing. A lip portion 34 extends outwardly beyond the end of the cylindrical portion 16 of the housing and provides a seat for an annular gasket 36 which seals the interface between the threaded cap 22 and the cylindrical portion 16 when the housing is assembled.

The outer rim portion of the inner section 24 has an axially projecting annular flange 38. The outer section 26, of the end cap has an axially projecting annular flange portion 40 which is inserted telescopically within the flange portion 38 and seats against the surface 30 of the inner section 24. The outer section 26 includes a central circular disc portion forming an outer flat surface 42 and an inner flat surface 44 which is spaced from and parallel to the flat surface 30 of the section 24 when the two sections 24 and 26 are joined. A sealing member 46 made of a suitable elastomeric material, such as natural or synthetic rubber, is positioned between the surfaces 30 and 44 before the two sections 24 and 26 are assembled. When assembled, the two sections are joined by a suitable cement applied between the telescoping surfaces of the two sections.

Sections 24 and 26 and the sealing member 46 are provided with a plurality of circular holes positioned so as to be axially aligned when the sections are assembled to form a plurality of openings in the end cap. The holes in the inner section 24, indicated at 48, and the holes through the outer section 26, indicated at 50, are substantially the same diameter, which is slightly larger than the diameter of the tip cables 14, permitting the tip cables to be inserted through the holes. The associated holes through the gasket member 46, as indicated at 52, are formed with a slightly tapered shape terminating in a slight inwardly projecting lip 54 at the smaller diameter end. The larger diameter end of the tapered openings 52 is adjacent the inner surface 44 of the outer section 26. The larger diameter end of the openings 52 is slightly smaller in diameter than the outer diameter of the tip cables. This permits the end of a tip cable to be forced through the opening from outside the housing, compressing the elastomeric material around the opening due to the wedging action of the cable forcing the elastomeric material radially outwardly as the cable is forced through the tapered opening. The lip 54 insures that a complete seal is made between the outer surface of the tip cable and the elastomeric sealing member.

The outer section 26 is molded with a plurality of knock-out plug elements 56 projecting from each of the openings 50. The knock-out elements 56 are frusto-conical in shape and are preferably hollow in the center but closed off at the smaller diameter end. The larger diameter end of the knock-out elements 56 has a lip portion which is integral with the outer section 26 around the inner end of each of the holes 50. Thus the knock-out plug elements 56 seal off the openings 50. The taper of the openings 52 and the knock-out plug elements 56 are substantially equal but the diameter of the plug elements is slightly less than the inner diameter of the openings 52 so that an annular space is provided between the plug elements and the surrounding sealing member 46.

Initially all of the openings through the end cap are sealed off by the plug elements 56 prior to installation of the splice. At the time of installation, when the number of tip cables is determined, the corresponding number of knock-out plug elements are removed. Because the plug elements are joined by a very thin section of molded plastic material at the junction between the lip of each plug element and the margin of the opening 50, the connection between the plug elements and the associated sections 26 can be easily broken. When the ends of plug elements projecting beyond the inner section are hit with a blow from the side, the sealing connection between the plug elements and the end cap section 26 is fractured, allowing the plug to be removed from the opening. The knock-out plug elements remaining in the unused openings, by projecting inwardly, are protected by the housing when assembly is complete. Once a plug element is knocked out of the opening, a tip cable can be inserted through the opening in the manner described.

Plug elements, by extending through the openings in the sealing member 46 serve an important function in maintaining an effective seal between the sealing member and the tip cables. When a plug element is removed and a cable inserted through an opening, the cable, being larger than the opening through the sealing member, causes the elastomeric material of the sealing member to be displaced radially outwardly from the opening. The elastomeric material, being substantially incompressible, is forced to squeeze laterally against the plugs in any adjacent unused openings surrounding the opening receiving the cable. The plugs, by restricting the amount of lateral movement of the elastomeric material, insure that the elastomeric material is squeezed securely against the outer surface of the tip cable to perfect a seal. This arrangement assures that a good seal is formed with a tip cable regardless of whether the surrounding openings also received tip cables or remain unused. Under this arrangement, it has been found that an equally effective seal is made with a tip cable irrespective of the number of tip cables passing through the end cap.

What is claimed:

1. In a housing for splicing a trunk cable to a plurality of tip cables, a detachable end cap for the housing for receiving the tip cables comprising:

a first member having a first plurality of holes of larger diameter than the tip cables, a second member having a second plurality of holes axially aligned with said first plurality of holes, a plurality of tapered conically shaped knockout members mounted in the holes in the first member at their larger ends and projecting through the holes in the second member at their smaller ends, the knockout members closing off the holes in the first member, and a sealing member of elastomeric material positioned between the first and second members and having holes aligned with the holes in the first and second members through which the knockout members project, the holes through the sealing member being smaller in diameter than the tip cables.

2. The housing and end cap of claim 1 wherein the knockout members where they pass through the holes in the sealing member are of slightly smaller diameter so to form a small annulus between the sealing member and the knockout members.

3. The housing and end cap of claim 1 wherein the holes through the sealing member are tapered in the same direction as the knockout members.

4. The housing and end cap of claim 3 wherein the sealing member is formed with a radially inwardly projecting lip at the smaller diameter end of each hole.

5. The housing and end cap of claim 1 wherein the first and second members engage each other around the outer periphery, the members having adjacent parallel spaced surfaces between which the sealing member is clamped, said holes extending with their axes perpendicular to said surfaces.

6. The housing and end cap of claim 5 wherein the distance between said parallel surfaces is substantially equal to the thickness of the sealing member.

7. In a cable splice housing for receiving a plurality of cables, means for admitting one or more cables into the housing, comprising inner and outer plates joined together around their margins and forming a portion of the housing, an elastomeric seal filling the space between the plates, the inner and outer plates and the seal having a plurality of axially aligned openings for receiving the cables, and a plurality of elongated knockout members secured in the openings in one plate, the knockout members projecting through the axially aligned openings in the seal and the other plate.

8. The combination of claim 7 wherein the knockout members are secured to the outer plate and project through the openings in the inner plate into the interior of the housing.

9. The combination of claim 7 wherein the knockout members are tapered with the larger end secured to the outer plate.

10. The combination of claim 9 wherein the openings in the seal are tapered in the same direction as the knockout members.

11. The combination of claim 10 wherein the openings in the seal are larger than the knockout members whereby there is space between the knockout members and the surrounding openings in the seal.

12. The combination of claim 9 wherein the knockout members are molded integrally with the outer plate.

* * * * *